United States Patent
Yang et al.

(10) Patent No.: US 10,810,048 B2
(45) Date of Patent: Oct. 20, 2020

(54) SYSTEMS AND METHODS FOR DYNAMIC ALLOCATION OF COMPILATION MACHINES

(71) Applicant: Huizhou TCL Mobile Communication Co., Ltd, Huizhou, Guangdong (CN)

(72) Inventors: Fan Yang, Huizhou (CN); Qiujuan Xie, Huizhou (CN); Enli Xiang, Huizhou (CN); Julan Chen, Guangdong (CN); Jiaqiong Feng, Guangdong (CN)

(73) Assignee: HUIZHOU TCL MOBILE COMMUNICATION CO., LTD, Huizhou, Guangdong Province (CN)

( * ) Notice: Subject to any disclaimer, the term of this patent is extended or adjusted under 35 U.S.C. 154(b) by 358 days.

(21) Appl. No.: 15/318,639

(22) PCT Filed: Jun. 8, 2016

(86) PCT No.: PCT/CN2016/085248
§ 371 (c)(1),
(2) Date: Dec. 13, 2016

(87) PCT Pub. No.: WO2017/063374
PCT Pub. Date: Apr. 20, 2017

(65) Prior Publication Data
US 2017/0286166 A1 Oct. 5, 2017

(30) Foreign Application Priority Data

Oct. 13, 2015 (CN) .......................... 2015 1 0658136

(51) Int. Cl.
*G06F 9/50* (2006.01)
*G06F 8/41* (2018.01)

(52) U.S. Cl.
CPC ............... *G06F 9/505* (2013.01); *G06F 8/47* (2013.01); *G06F 9/5033* (2013.01); *G06F 8/41* (2013.01)

(58) Field of Classification Search
CPC ... G06F 8/47; G06F 9/505; G06F 8/41; G06F 9/5033; G06F 8/71; G06F 8/70
See application file for complete search history.

(56) References Cited

U.S. PATENT DOCUMENTS

| 5,440,747 A | * | 8/1995 | Kiuchi | ................. G06F 1/3203 710/267 |
| 2003/0037093 A1 | * | 2/2003 | Bhat | ....................... G06F 9/505 718/105 |

(Continued)

FOREIGN PATENT DOCUMENTS

| CN | 101290581 A | 10/2008 |
| CN | 103019772 A | 4/2013 |

(Continued)

OTHER PUBLICATIONS

International Search Report on corresponding PCT application (PCT/CN2016/085248) from International Searching Authority (CN) dated Sep. 20, 2016.

*Primary Examiner* — Jorge A Chu Joy-Davila
(74) *Attorney, Agent, or Firm* — Cheng-Ju Chiang (57) ABSTRACT

Systems and methods for dynamic allocation of compilation machines are disclosed. A method includes: initiating and storing a task to be compiled and marking the task in a waiting state to wait for compilation of a compilation machine; fetching a compile command, and analyzing a current compile state of the compilation machine and further determining based on the current compile state whether to set the task to be compiled to continue waiting for compilation or enter a compile stage, wherein if to continue waiting for compilation, then the task to be compiled may be (Continued)

further held in storage; otherwise if to enter the compile stage, then the task may be transmitted to the compilation machine for compilation. Thus, the tasks can be automatically assigned to the compilation machines to achieve efficient use of the compilation machines and reduce the otherwise potential error rate due to human intervention.

14 Claims, 4 Drawing Sheets

(56) References Cited

U.S. PATENT DOCUMENTS

| | | | |
|---|---|---|---|
| 2003/0105798 A1* | 6/2003 | Kim | G06F 9/4812 718/105 |
| 2007/0073732 A1* | 3/2007 | Kahn | G06F 9/4862 |
| 2007/0074207 A1* | 3/2007 | Bates | G06F 9/5027 718/1 |
| 2007/0234320 A1* | 10/2007 | Gu | G06F 8/41 717/140 |
| 2012/0204176 A1* | 8/2012 | Tian | G06F 9/505 718/1 |
| 2012/0246107 A1 | 9/2012 | Beaty et al. | |
| 2014/0129864 A1* | 5/2014 | Sun | G06F 1/3206 713/324 |
| 2015/0178125 A1* | 6/2015 | van der Lugt | G06F 9/4881 718/102 |
| 2016/0139952 A1* | 5/2016 | Geng | G06F 9/4818 718/103 |
| 2017/0068669 A1* | 3/2017 | Levy | H04L 45/7453 |

FOREIGN PATENT DOCUMENTS

| | | |
|---|---|---|
| CN | 103176774 A | 6/2013 |
| CN | 103440136 A | 12/2013 |
| CN | 104123184 A | 10/2014 |
| CN | 104657204 A | 5/2015 |
| CN | 105373430 A | 3/2016 |
| EP | 0908818 A2 | 4/1999 |

\* cited by examiner

SYSTEMS AND METHODS FOR DYNAMIC ALLOCATION OF COMPILATION MACHINES

CROSS-REFERENCE TO RELATED APPLICATIONS

The present application is a 35 U.S.C. § 371 National Phase conversion of International (PCT) Patent Application No. PCT/CN2016/085248 filed Jun. 8, 2016, which claims foreign priority of Chinese Patent Application No. 201510658136.6, filed on Oct. 13, 2015 in the State Intellectual Property Office of China, the contents of all of which are hereby incorporated by reference.

TECHNICAL FIELD

Embodiments of the present disclosure generally relate to compilation machines, and in particular to systems and methods for dynamic allocation of compilation machines.

BACKGROUND

Today, intelligent terminals are developing at a rapid pace and have gained enormous popularity, meanwhile the software programs running on these intelligent terminals need to be released at increasingly higher frequency. Compilation machines are a requisite for software distribution, so how to achieve efficient software distribution with limited compilation machine resources has long been the subject the industry is constantly exploring.

Most manufacturers still use the way of statically configuring the compilation machines, according to which current compilation machines may be deployed in an integration system, e.g., software integration system, e.g., Jenkins, which means there would be no database-based maintenance, and each software distribution release would require manually selecting one from among multiple compilation machines. Such way may have the following drawbacks: low compilation machine efficiency and demands for human intervention—hence resulting in a high cost and high potential error rate due to human involvement.

SUMMARY

In view of the above, the present disclosure provides systems and methods for dynamic allocation of compilation machines, according to which tasks can be automatically allocated to the compilation machines to achieve efficient use of compilation machine and reduce the otherwise potential error rate.

There is provided a method for dynamic allocation of compilation machines, the method comprising: initiating and storing a task to be compiled and further marking the task in a waiting state to wait for compilation of a compilation machine, where when saving the task to be compiled, three data tables may further be established to record project information, compilation machines information, and compilation tasks information, respectively;

fetching a compile command, and analyzing a current compile state of the compilation machine and further determining based on the current compile state whether to set the task to be compiled to continue waiting for compilation or enter a compile stage, and if the task is to continue waiting for compilation, then holding the task to be compiled in storage; otherwise if the task is to enter the compile stage, transmitting the task to be compiled to the compilation machine for compilation; where the method may further comprise:

acquiring a task compiling ability of the compilation machine, the task compiling ability comprising a first threshold number of tasks of a same type the compilation machine is able to compile simultaneously as well as a second threshold number of maximum tasks the compilation machine is able to compile simultaneously, the first threshold number being smaller than or equal to the second threshold number.

Analyzing the current compile state of the compilation machine may comprise:

determining a first time whether a number of tasks the compilation machine is currently compiling is greater than or equal to the first threshold number, and if the first determination result is no, setting the task to be compiled to enter the compile stage and further transmitting the task to be compiled to the compilation machine.

The project information may comprise a type of the task to be compiled; the compilation machines information may comprise an IP address, name, types of tasks being compiled, and current remaining compilation space, of each compilation machine; and the compilation tasks information may comprise information of compilation machines that are currently working and information of tasks they are compiling.

The method may further comprise: if the first determination result is yes, then determining a second time whether a number of tasks the compilation machine is currently compiling is greater than or equal to the second threshold number, and if the second determination result is yes, setting the task to be compiled to continue waiting for compilation.

The method may further comprise: if the second determination result is no, then determining a third time whether the tasks the compilation machine is currently compiling is of a same type as the task to be compiled, and if the third determination result is no, setting the task to be compiled to enter the compile stage and further transmitting the task to be compiled to the compilation machine.

The method may further comprise: if the third determination result is yes, then determining a fourth time whether a number of tasks of the same type as the task to be compiled is greater than or equal to the first threshold number, and if the fourth determination result is no, setting the task to be compiled to enter the compile stage and further transmitting the task to be compiled to the compilation machine; otherwise if the fourth determination result is yes, setting the task to be compiled to continue waiting for compilation.

There is also provided another method for dynamic allocation of compilation machines, the method comprising: initiating and saving a task to be compiled and further marking the task in a waiting state to wait for compilation of a compilation machine; and fetching a compile command and analyzing a current compile state of the compilation machine and further determining based on the current compile state whether to set the task to be compiled to continue waiting for compilation or enter a compile stage, and if the task is to continue waiting for compilation, then holding the task to be compiled in storage; otherwise if the task is to enter the compile stage, transmitting the task to be compiled to the compilation for compilation.

The method may further comprise: establishing three data tables to record project information, compilation machines information, and compilation tasks information, respectively, when saving the task to be compiled.

The project information may comprise a type of the task to be compiled; the compilation machines information may comprise an IP address, name, types of tasks being compiled, and current remaining compilation space, of each compilation machine; and the compilation tasks information may comprise information of compilation machines that are currently working and information of tasks they are compiling.

The method may further comprise: acquiring a task compiling ability of the compilation machine, the task compiling ability comprising a first threshold number of tasks of a same type the compilation machine is able to compile simultaneously as well as a second threshold number of maximum tasks the compilation machine is able to compile simultaneously, the first threshold number being smaller than or equal to the second threshold number. Analyzing the current compile state of the compilation machine may comprise: determining a first time whether a number of tasks the compilation machine is currently compiling is greater than or equal to the first threshold number, and if the first determination result is no, setting the task to be compiled to enter the compile stage and further transmitting the task to be compiled to the compilation machine.

The method may further comprise: if the first determination result is yes, then determining a second time whether a number of tasks the compilation machine is currently compiling is greater than or equal to the second threshold number, and if the second determination result is yes, setting the task to be compiled to continue waiting for compilation.

The method may further comprise: if the second determination result is no, then determining a third time whether the tasks the compilation machine is currently compiling is of a same type as the task to be compiled, and if the third determination result is no, setting the task to be compiled to enter the compile stage and further transmitting the task to be compiled to the compilation machine.

The method may further comprise: if the third determination result is yes, then determining a fourth time whether a number of tasks of the same type as the task to be compiled is greater than or equal to the first threshold number, and if the fourth determination result is no, setting the task to be compiled to enter the compile stage and further transmitting the task to be compiled to the compilation machine; otherwise if the fourth determination result is yes, setting the task to be compiled to continue waiting for compilation.

There is also provided a system for dynamic allocation of compilation machines, the system comprising: a customized mechanism configured to initiate a task to be compiled and further initiate a compile command; a database configured to store the task to be compiled; and an allocation mechanism configured to mark the task to be compiled that is stored in the database in a waiting state to wait for compilation of a compilation machine, and analyze, when receiving the compile command, a current compile state of the compilation machine and determine based on the current compile state whether to set the task to be compiled to continue waiting for compilation or enter a compile stage, where if the task is to continue waiting for compilation, then the database may be configured to hold the task to be compiled in storage; otherwise if the task is to enter the compile stage, the allocation mechanism may be configured to transmit the task to be compiled to the compilation machine for compilation.

The allocation mechanism may further comprise: an acquisition unit configured to acquire a task compiling ability of the compilation machine, the task compiling ability comprising a first threshold number of tasks of a same type the compilation machine is able to compile simultaneously as well as a second threshold number of maximum tasks the compilation machine is able to compile simultaneously, the first threshold number being smaller than or equal to the second threshold number; a first determination unit configured to determine whether a number of tasks the compilation machine is currently compiling is greater than or equal to the first threshold number; and an assignment unit configured to, if the determination result of the first determination unit is no, set the task to be compiled to enter the compile stage and further transmit the task to be compiled to the compilation machine.

The allocation mechanism may further comprise: a second determination unit configured to, if the determination result of the first determination unit is yes, further determine whether a number of tasks the compilation machine is currently compiling is greater than or equal to the second threshold number. The assignment unit may be configured to set the task to be compiled to continue waiting if the determination result of the second determination unit is yes.

The allocation mechanism may further comprise: a third determination unit configured to, if the determination result of the second determination unit is no, further determine whether the tasks the compilation machine is currently compiling is of a same type as the task to be compiled. The assignment unit may further be configured to set the task to be compiled to enter the compile stage and further transmit the task to be compiled to the compilation machine if the determination result of the third determination unit is no.

The allocation mechanism may further comprise: a fourth determination unit configured to, if the determination result of the third determination unit is yes, further determine whether a number of tasks of the same type as the task to be compiled is greater than or equal to the first threshold number. The assignment unit may be configured to, if the determination result of the fourth determination unit is no, set the task to be compiled to enter the compile stage and further transmit the task to be compiled to the compilation machine, and otherwise if the determination result of the fourth determination unit is yes, set the task to be compiled to continue waiting for compilation.

According to the method for dynamic allocation of compilation machines disclosed by the present disclosure, a task to be compiled may first be initiated and saved and further marked in a waiting state to wait for the compilation of a compilation machine, then a compile command may be fetched and the current compile state of the compilation machine may be analyzed and further based on to determine whether to set the task to be compiled to continue waiting for compilation or enter the compile stage. If the task is to continue waiting for compilation, then it will be still held in storage; otherwise if it is to enter the compile stage, then the task would be transmitted to the compilation machine for compilation. Thus, the tasks can be automatically assigned to the compilation machines to achieve efficient use of the compilation machines and reduce the otherwise potential error rate due to human intervention.

DETAILED DESCRIPTION

Figure 1:
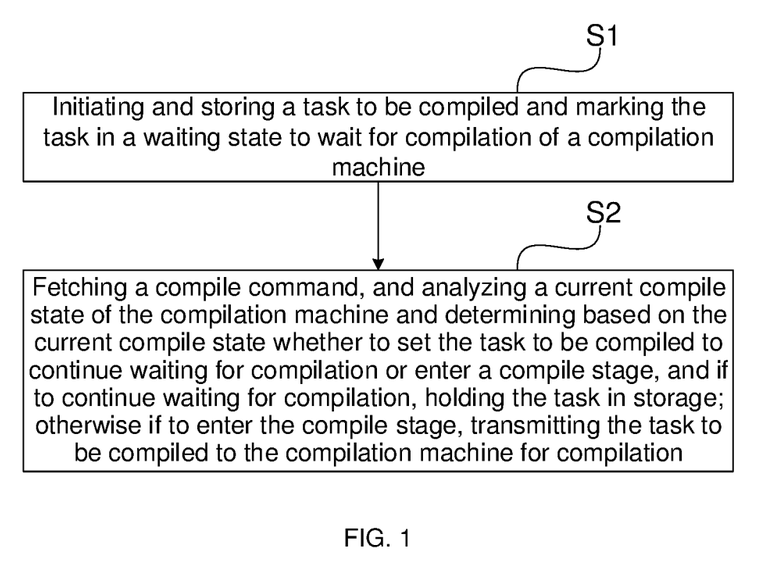
FIG. 1 is a flowchart illustrating a method for dynamic allocation of compilation machines according to an embodiment of the disclosure.

Referring to FIG. 1, a flowchart illustrating a method for dynamic allocation of compilation machines according to an embodiment of the disclosure is depicted. The method may comprise the following blocks.

In S1, a task to be compiled may be initiated and stored, and may further be marked in a waiting state to wait for compilation of a compilation machine.

In particular, attribute values in two fields can be preconfigured, including auto_flag and wait_flag, settings of which may comprise the following two cases.

In a first case, auto_flag=1 may indicate the corresponding task is in the compiled state, i.e., it has entered the compile stage, and typically auto_flag would have a default 0; analogously, wait_flag=1 may denote the corresponding task is in the waiting state, and typically may have a default 1.

In a second case, auto_flag=0 may indicate the corresponding task is in the compiled state, and typically may have a default 1; analogously, wait_flag=0 may denote the corresponding task is in the waiting state, and so may have a default 1.

For convenience of description, hereinafter, meanings of the attribute values auto_flag and wait_flag will be in accordance with the first case.

Therefore, in the present block of the method, the auto_flag of the task to be compiled may first be set to 0, and wait_flag set to 1, to denote a waiting state.

In S2, a compile command may be fetched, and a current compile state of the compilation machine may be analyzed and based on to determine whether to set the task to be compiled to continue waiting for compilation or enter the compile stage. If the task to be compiled is to continue waiting for compilation, then it may still be held in storage; otherwise if to enter the compile stage, it would be transmitted to the compilation machine to be compiled.

Further, a task compiling ability of the compilation machine may be acquired. The task compiling ability may comprise a first threshold number of tasks of a same type the compilation machine is able to compile simultaneously as well as a second threshold number of maximum tasks the compilation machine is able to compile simultaneously, wherein the first threshold number may be smaller than or equal to the second threshold number.

Figure 2:
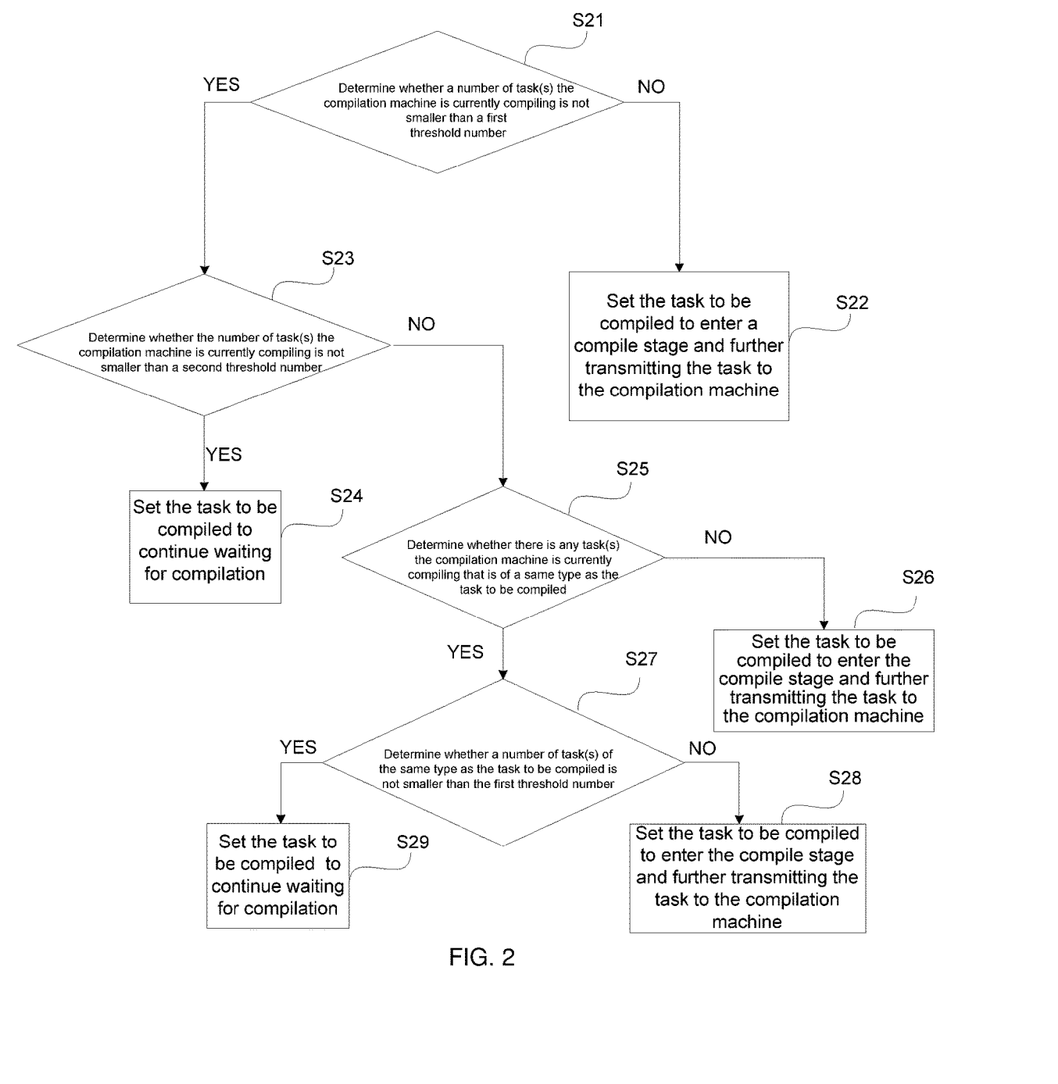
FIG. 2 is a flowchart illustrating a method for dynamic allocation of compilation machines according to another embodiment of the disclosure.

Referring now to FIG. 2, in which a flowchart illustrating a method for dynamic allocation of compilation machines according to another embodiment of the disclosure is depicted and in which the specific determination process regarding the above block S2 is further elaborated. Block S2 may specifically comprise the following steps.

In S21, the process may include determining whether a number of tasks the compilation machine is currently compiling is greater than or equal to the first threshold number.

If the determination result is no, then the process may proceed to S22; otherwise if the determination result is yes, proceed to S23.

In S22, the task to be compiled may be set to enter the compile stage and further transmitted to the compilation machine.

In particular, auto_flag of the task to be compiled may be set to 1, and wait_flag set to 0, to indicate the proceeding to the compile stage.

In S23, the process may include determining whether a number of tasks the compilation machine is currently compiling is greater than or equal to the second threshold number.

If the determination result is yes, then the process may proceed to S24; otherwise if the determination result is no, proceed to S25.

In S24, the task to be compiled may be set to continue waiting for compilation.

Specifically, the setting in the present block may comprise two cases.

First, if determining that the number of tasks the compilation machine is currently compiling is greater than the second threshold number by an amount larger than or equal to 2, then the task to be compiled may further be set from the current waiting state to entering a sleep stage, i.e., the auto_flag of the task to be compiled may be set to 0, and the wait_flag may also be set to 0. Until the number of tasks the compilation machine is currently compiling is greater than the second threshold number by 1, then the auto_flag of the task to be compiled may be set 0, and wait_flag value set to 1.

In a second case, if the number of tasks the compilation machine is currently compiling is greater than the second threshold number by 1, then the auto_flag of the task to be compiled may be set 0, and wait_flag value set to 1.

In the present block a waiting period may further be configured, e.g., 2 minutes, so that if the waiting period expires, new scans and judgments may be performed.

In S25, the process may comprise determining whether the tasks the compilation machine is currently compiling is of the same type as the task to be compiled.

If the determination result is no, then the process may proceed to S26; otherwise if the determination result is yes, proceed to S27.

In S26, the task to be compiled may be set to enter the compile stage and further transmitted to the compilation machine.

In particular, auto_flag of the task to be compiled may be set to 1, and wait_flag set to 0, to indicate the proceeding to the compile stage.

In S27, the process may include determining whether a number of tasks of the same type as the task to be compiled is greater than or equal to the first threshold number.

If the determination result is no, then the process may proceed to S28; otherwise if the determination result is yes, proceed to S29.

In S28, the task to be compiled may be set to enter the compile stage and further transmitted to the compilation machine.

In particular, auto_flag of the task to be compiled may be set to 1, and wait_flag set to 0, to indicate the proceeding to the compile stage.

In S29, the task to be compiled may be set to continue waiting for compilation.

The above setting in S29 may particularly comprise the following two cases.

First, if in S27 it is determined that the number of tasks of the same type as the task to be compiled is greater than the first threshold number by an amount larger than or equal to 2, then the task to be compiled may further be set from the current waiting state to entering a sleep stage, in particular, the auto_flag of the task to be compiled may be set to 0, and the wait_flag set to 0. Until the number of tasks of the same type as the task to be compiled is greater than the first threshold number by 1, then the auto_flag of the task to be compiled may be set 0, and wait_flag value set to 1.

In a second case, if in S27 the number of tasks of the same type as the task to be compiled is determined as greater than the first threshold number by 1, then the auto_flag of the task to be compiled may be set 0, and wait_flag value set to 1.

In the present block a waiting period may further be configured, e.g., 2 minutes, so that if the waiting period expires, new scans and judgments may be performed.

Therefore, according to the present embodiment the tasks to be compiled can be allocated dynamically without the need for human intervention, thus achieving efficient compilation and reducing the otherwise potential error rate.

Furthermore, in S1 three data tables may also be established when saving the task to be compiled, including t_product, t_web_host_info, and t_web_create_perso, which may be used to record the project information, compilation machines information, and compilation tasks information, respectively. The project information may comprise a type of the task to be compiled. The compilation machines information may comprise an IP address, name, types of tasks being compiled, and current remaining compilation space, of each compilation machine. The compilation tasks information may comprise information of compilation machines that are currently working and information of tasks they are currently compiling.

A compilation machine may need first be selected prior to setting the state of the compilation task in S2, the specific process of which may be as follows. First determine whether there is a vacant compilation machine. If there is none, then randomly select a compilation machine and associate the task to be compiled saved in S1 with the selected compilation machine, i.e., send the task to be compiled to the compilation machine; or, analyze a number of tasks each working compilation machine is currently compiling, and so send the task to be compiled that is saved in S1 to a compilation machine with relatively fewer compilation tasks. Typically, the task to be compiled may be sent to a compilation machine with relatively fewer compilation tasks which may be of the same type as the task to be compiled.

If there are any vacant compilation machines, then further determine whether the number of the vacant compilation machines is greater than or equal to two, and if yes, randomly select one to compile the task to be compiled; otherwise if there is only one, select the one to compile the task.

After having selected the corresponding compilation machine for the task to be compiled, typically the IP address of the selected compilation machine may need to be obtained such that the task to be compiled can be transmitted to the corresponding compilation machine with the IP address.

Thus, according to the present embodiment both the compilation machines and the tasks to be compiled can be dynamically allocated, thereby achieving high compilation efficiency and reducing the potential error rate due to human involvement.

Figure 3:
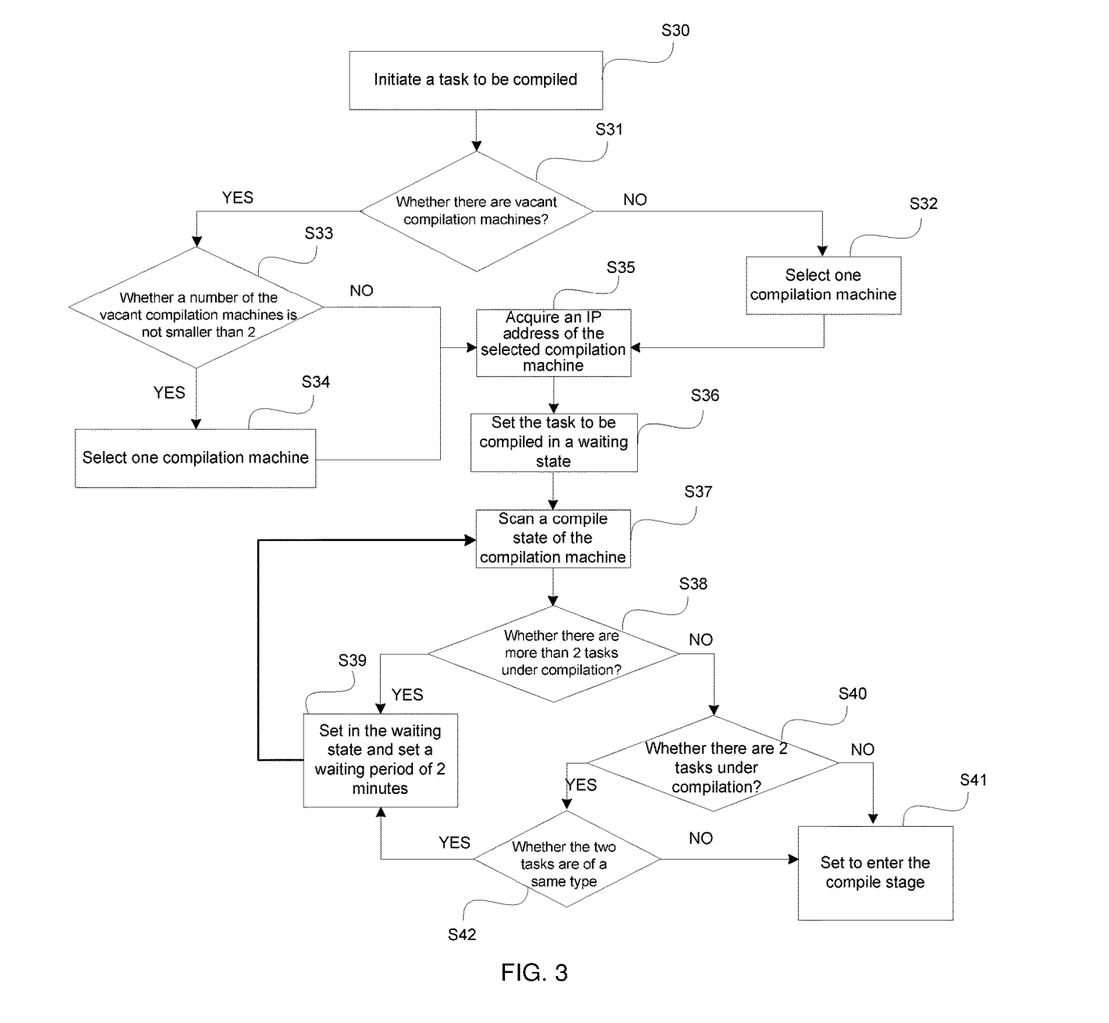
FIG. 3 is a flowchart illustrating a method for dynamic allocation of compilation machines according to yet another embodiment of the disclosure.

Referring to FIG. 3, a flowchart illustrating a method for dynamic allocation of compilation machines according to yet another embodiment of the disclosure is depicted. It is worth noting that for purposes of illustration, the number of tasks of a same type that the compilation machine can simultaneously compile equals 1, and the maximum number of tasks the compilation machine can simultaneously compile equals 2.

The method may comprise the following blocks.

In S30, a task to be compiled may be initiated. There may be initiated a number of tasks to be compiled, such as 1, 2, 3, . . . , n, where n is a natural number.

In S31, the method includes determining whether there is a vacant compilation machine. If the determination result is yes, then the process may proceed to S32; otherwise if the determination result is no, proceed to S33.

In S32, one compilation machine may be selected from the vacant compilation machines. The principles for selection are the same as mentioned above, and thus will not be detailed again. The method may then proceed to S35 in which an IP address of the selected compilation machine may be obtained.

In S33, the method may comprise determining whether a number of the vacant compilation machines is greater than or equal to 2. If the determination result is yes, then the process may proceed to S34; otherwise if the determination result is no, proceed to S35.

In S34, one compilation machine may be selected from the vacant compilation machines. Then the method may proceed to S35 in which an IP address of the selected compilation machine may be obtained.

In S35, the IP address of the only vacant compilation machine may be obtained.

In S36, the task to be compiled may be set in a waiting state. Alternatively, block S36 may also be executed in between blocks S30 and S31.

In S37, the method may include scanning the compile state of a compilation machine. In particular, scanning the compile state means scanning the number of tasks the compilation machine is currently compiling.

In S38, the method may include determining whether the number of tasks currently being compiled is greater than two. If the determination result is yes, then the method may proceed to S39; otherwise if the determination result is no, proceed to S40.

In S39, the task to be compiled may be set in the waiting state, and a waiting period may be set to 2 minutes. If the waiting period expires, i.e., 2 minutes is past, then the method may return to S37, in which a new scan may be performed to detect the compile state of the compilation machine.

In particular, regarding the task to be compiled in the waiting state, the auto_flag thereof may be set to 0, and the wait_flag may be set to 0.

In S40, the method may include determining whether a number of tasks currently being compiled equals two. If the determination result is no, then the method may proceed to S41; otherwise if the determination result is yes, proceed to S42.

In S41, the task to be compiled may be set to enter a compile stage and may thus be transmitted to the suitable compilation machine. In particular, as to the task to be compiled, the auto_flag thereof may be set to 1, and the wait_flag may be set to 0.

In S42, the method may include determining whether the two tasks are of a same type, if the determination result is yes, then the method may turn to S39; otherwise if the determination result is no, turn to S41.

In particular, if the method turns to S39 after the present block, then the auto_flag of the task to be compiled in S39 may be set to 0, while the wait_flag thereof may be set to 1.

Figure 4:
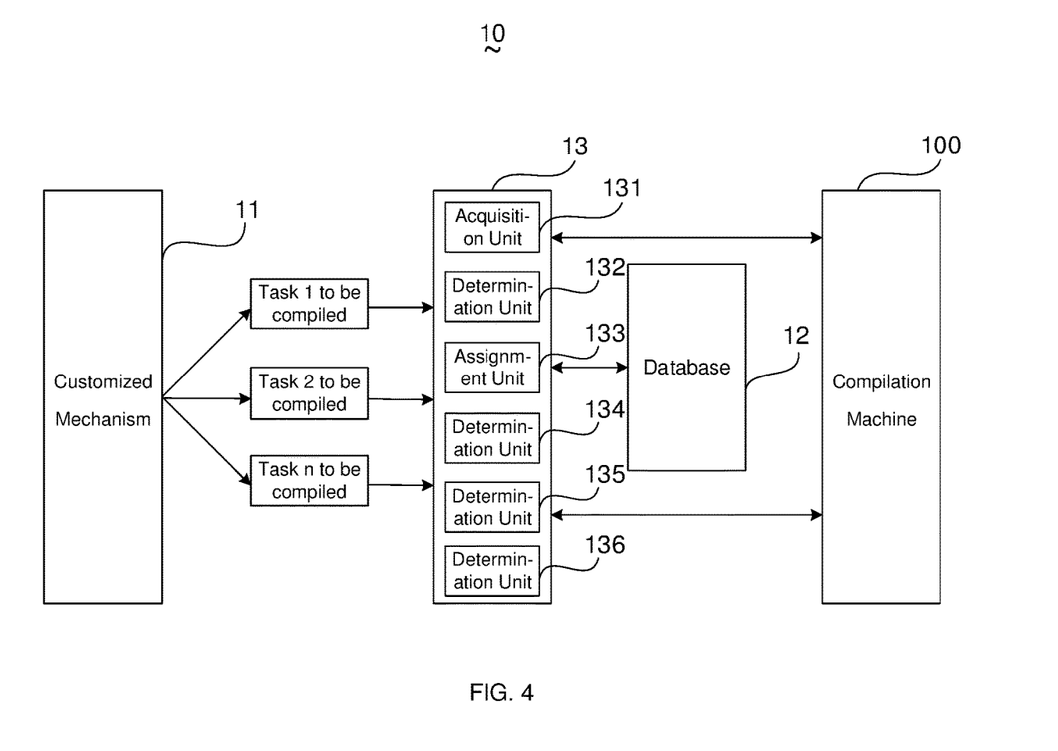
FIG. 4 is a block diagram illustrating a system for dynamic allocation of compilation machines according to an embodiment of the disclosure.

Referring now to FIG. 4, a block diagram illustrating a system for dynamic allocation of compilation machines according to an embodiment of the disclosure is depicted. The system 10 may comprise a customized mechanism 11, a database 12, and an allocation mechanism 13.

The customized mechanism 11 may be configured to initiate a task to be compiled, such as the task 1 to be compiled, task 2 to be compiled . . . , through task n to be compiled as mentioned above, where n is a natural number. The customized mechanism 11 may further be configured to initiate a compile command.

The database 12 may be configured to store the tasks to be compiled. Further, three data tables may be established in the database, including t_product, t_web_host_info, and t_web_create_perso, which may record the project information, compilation machine information, and compilation tasks information, respectively. The contents contained in the project information, compilation machine information, and compilation tasks information are similar to those mentioned above, and thus will not be detailed again.

The allocation mechanism 13 may be configured to mark the task to be compiled that is stored in the database 12 in a waiting state to wait for compilation of a compilation machine, and analyze, after receiving the compile command, a current compile state of the compilation machine 100 and determine based on the current compile state whether to set the task to be compiled to continue waiting for compilation or enter a compile stage. If the task to be compiled is to continue waiting for compilation, then the database 12 may still hold the task to be compiled in storage; otherwise if the task to be compiled is to enter the compile stage, then the allocation mechanism 13 may be configured to transmit the task to be compiled to the compilation machine 100 which may then perform compilation of the task to be compiled.

In particular, as to the particular method of setting the task to be compiled in the waiting state or to enter the compile stage, attribute values in two fields can be preconfigured, including auto_flag and wait_flag, settings of which may comprise the following two cases.

In a first case, auto_flag=1 may indicate the corresponding task is in the compiled state, i.e., it has entered the compile stage, and auto_flag would typically have a default 0; analogously, wait_flag=1 may denote the corresponding task is in the waiting state, and may typically have a default 0.

In a second case, auto_flag=0 may indicate the corresponding task is in the compiled state, and may have a default 1; analogously, wait_flag=0 may denote the corresponding task is in the waiting state, and may have a default 1.

For convenience of description, hereinafter, meanings of the attribute values auto_flag and wait_flag will be in accordance with the first case.

Therefore, the allocation mechanism 13 may be configured to first set the auto_flag of the task to be compiled that is stored in the database 12 to 0, and the wait_flag to 1, to denote a waiting state. If the tast to be compiled is to continue waiting for compilation, then the auto_flag thereof may be set to 0, while the wait_flag set to 1; or the auto_flag thereof may be set to 0, while the wait_flag also set to 0. If the task to be compiled is to enter the compile stage, then the auto_flag thereof may be set to 1, while the wait_flag set to 0.

Optionally, the allocation mechanism 13 may further comprise an acquisition unit 131, a determination unit 132, and an assignment unit 133. The acquisition unit 131 may be configured to acquire a task compiling ability of the compilation machine 100, where the task compiling ability may comprise a first threshold number of tasks of a same type the compilation machine 100 is able to compile simultaneously as well as a second threshold number of maximum tasks the compilation machine 100 is able to compile simultaneously, wherein the first threshold number may be smaller than or equal to the second threshold number. The determination unit 132 may be configured to determine whether a number of tasks the compilation machine 100 is currently compiling is greater than or equal to the first threshold number. The assignment unit 133 may be configured to, if the determination result of the determination unit 132 is no, set the task to be compiled to enter the compile stage and further transmit the task to be compiled to the compilation machine 100. In particular, auto_flag of the task to be compiled may be set to 1, and wait_flag set to 0, to indicate the proceeding to the compile stage.

Further, the allocation mechanism 13 may further comprise a determination unit 134 configured to, if the determination result of the determination unit 132 is yes, further determine whether a number of tasks the compilation machine 100 is currently compiling is greater than or equal to the second threshold number. If the determination result of the determination unit 134 is yes, then the assignment unit 133 may be configured to set the task to be compiled to continue waiting for compilation. Specifically, the setting in the present block may comprise the following two cases.

First, if determining that the number of tasks the compilation machine 100 is currently compiling is greater than the second threshold number by an amount larger than or equal to 2, then the task to be compiled may further be set from the current waiting state to entering a sleep stage, i.e., the auto_flag of the task to be compiled may be set to 0, and the wait_flag may also be set to 0. Until the number of tasks the compilation machine 100 is currently compiling is greater than the second threshold number by 1, then the auto_flag of the task to be compiled may be set 0, and wait_flag value set to 1.

In a second case, if the number of tasks the compilation machine 100 is currently compiling is greater than the second threshold number by 1, then the auto_flag of the task to be compiled may be set 0, and wait_flag value set to 1.

In the present embodiment, a waiting period may further be configured, e.g., 2 minutes, so that if the waiting period expires, new scans and judgments may be performed.

Further, the allocation mechanism 13 may also comprise a determination unit 135 configured to, if the determination result of the determination unit 134 is no, further determine whether the tasks the compilation machine 100 is currently compiling is of the same type as the task to be compiled. The assignment unit 133 may be configured to, if the determination result of the determination unit 135 is no, set the task to be compiled to enter the compile stage and further transmit the task to be compiled to the compilation machine 100. In particular, auto_flag of the task to be compiled may be set to 1, and wait_flag set to 0, to indicate the proceeding to the compile stage.

Further, the allocation mechanism 13 may also comprise a determination unit 136 configured to, if the determination result of the determination unit 135 is yes, further determine whether the number of tasks of the same type as the task to be compiled is greater than or equal to the first threshold number. The assignment unit 133 may be configured to, if the determination result of the determination unit 136 is no, set the task to be compiled to enter the compile stage and further transmit the task to be compiled to the compilation machine 100. In particular, auto_flag of the task to be compiled may be set to 1, and wait_flag set to 0, to indicate the proceeding to the compile stage.

If the determination result of the determination unit 136 is yes, then the assignment unit 133 may be configured to set the task to be compiled to continue waiting for compilation. The above setting may particularly comprise the following two cases.

First, if the determination unit 136 determines that the number of tasks of the same type as the task to be compiled is greater than the first threshold number by an amount larger than or equal to 2, then the task to be compiled may further be set from the current waiting state to a sleep stage, i.e., the auto_flag of the task to be compiled may be set to 0, and the wait_flag set to 0. Until the number of tasks of the same type as the task to be compiled is greater than the first threshold number by 1, then the auto_flag of the task to be compiled may be set 0, and wait_flag value set to 1.

In a second case, if the determination unit 136 determines that the number of tasks of the same type as the task to be compiled is greater than the first threshold number by 1, then the auto_flag of the task to be compiled may be set 0, and wait_flag value set to 1.

In the present embodiment, a waiting period may further be configured, e.g., 2 minutes, so that if the waiting period expires, new scans and judgments may be performed.

In summary, according to the dynamic compilation machine allocation solutions provided by the disclosure, the compilation machines can be dynamically allocated according to the tasks currently under compilation, thus eliminating the need to designate each time a specific compilation machine for a compilation task. Further, the compilation tasks can be continuously allocated during the compilation process, which means once a task is completed, a subsequent task would be automatically scanned, so that when there are multiple compilation tasks waiting in queue, the compilation machines will not be vacant for long periods of time hence leaving the compilation machines to be unused. Further, one compilation machine can support two or more simultaneous compilation tasks. Multiple compilation tasks can be performed simultaneously on different compilation machines and will not interfere with each other. Further, the entire compilation process does not require any manual operations, thus reducing the potential error rate associated with human intervention. In addition, once a compilation task is submitted, the suitable compilation machine can automatically be searched for, so in the case where a large number of compilation tasks need to be simultaneously performed, the compilation machines may gain a significant increase in their efficiency, thereby breaking the limitation that one compilation machine can only perform one compilation task at the same time.

Furthermore, it is apparent to those skilled in the art that the present disclosure also provides a system for dynamic allocation of compilation machines, the system comprising a non-transitory program storage medium and one or more processors. The non-transitory program storage medium stores a program executable by the one or more processors to perform the methods as described above. Furthermore, it is apparent to those skilled in the art that various units or modules 11-13 and 131-136, as shown in FIG. 4, can be software modules or software units. In another aspect, it is well-known that various software modules or software units can be inherently stored in the non-transitory program storage medium and executed by the one or more processors.

The above description merely depicts some exemplary embodiments of the disclosure, but is not intended to limit the scope of the disclosure. Any equivalent structural or flow transformations made to the disclosure, or any direct or indirect applications of the disclosure on any other related fields, shall all fall in the scope of the disclosure.

What is claimed is:

1. A method for allocation of compilation machines, comprising:
    initiating and storing a task to be compiled and marking the task in a waiting state to wait for compilation on a compilation machine, wherein marking the task in a waiting state includes preconfiguring a first attribute value and a second attribute value of the task and setting the first attribute value and the second attribute value to be different values, and wherein when storing the task to be compiled, three data tables are also established and configured to record project information, compilation machines information, and compilation tasks information, respectively;
    acquiring a first threshold number of tasks of a same type the compilation machine is able to compile simultaneously as well as a second threshold number of maximum tasks the compilation machine is able to compile simultaneously, the first threshold number being smaller than or equal to the second threshold number;
    fetching a compile command, and determining whether a number of tasks the compilation machine is currently compiling is greater than or equal to the first threshold number;
    upon determining that the number of tasks the compilation machine is currently compiling is less than the first threshold number, the task to be compiled is to enter the compile stage and further transmitted to the compilation machine; and
    upon determining that the number of tasks the compilation machine is currently compiling is greater than or equal to the first threshold number, determining whether the number of tasks the compilation machine is currently compiling is greater than or equal to the second threshold number, and setting the task to be compiled to continue waiting for compilation upon determining that the number of tasks the compilation machine is currently compiling is greater than or equal to the second threshold number;
    upon determining that the number of tasks the compilation machine is currently compiling is less than the second threshold number, determining whether there are any tasks the compilation machine is currently compiling that is of a same type as the task to be compiled, and upon determining that there is none, setting the task to be compiled to enter the compile stage and further transmitting the task to be compiled to the compilation machine;
    upon determining that there are any tasks of the same type as the task to be compiled that is currently compiled on the compilation machine, determining whether a number of tasks of the same type as the task to be compiled is greater than or equal to the first threshold number, and setting the task to be compiled to enter the compile stage and further transmitting the task to be compiled to the compilation machine upon determining that the number of tasks of the same type as the task to be compiled is less than the first threshold number;
    otherwise, setting the task to be compiled to continue waiting for compilation;
    wherein, prior to setting the task to be compiled to enter the compile stage or continue waiting for compilation, the method further comprises:

determining whether there is a vacant compilation machine;
upon determining that there is no vacant compilation machine, randomly selecting a compilation machine and sending the task to be compiled to the selected compilation machine;
upon determining that there is at least one vacant compilation machine, selecting one of the vacant compilation machine to compile the task to be compiled.

2. The method according to claim 1, wherein the project information comprises a type of the task to be compiled;
the compilation machines information comprises an IP address, name, type of tasks under compilation, and current remaining compilation space, of each compilation machine; and
the compilation tasks information comprises information of compilation machines that is currently working and information of tasks they are currently compiling.

3. The method according to claim 1, further comprising:
upon determining that the number of tasks the compilation machine is currently compiling is greater than the second threshold number by an amount larger than or equal to two, further setting the task to be compiled from the current waiting state to a sleep stage; and
until the number of tasks the compilation machine is currently compiling is greater than the second threshold number by one, returning the task to be compiled to the waiting state.

4. The method according to claim 3, further comprising: upon determining that setting the task to be compiled from the current waiting state to a sleep stage, setting both the first and second attribute values to be 0.

5. The method according to claim 1, wherein, sending the task to be compiled to a compilation machine with relatively fewer compilation tasks comprises sending the task to be compiled to a compilation machine with relatively fewer compilation tasks which are of the same type as the task to be compiled.

6. The method according to claim 1, wherein, upon determining that there is at least one vacant compilation machine, selecting one of the vacant compilation machine to compile the task to be compiled comprises:
upon determining that there is at least one vacant compilation machine, determining whether the number of the vacant compilation machine is greater than or equal to two;
upon determining that the number of the vacant compilation machine is greater than or equal to two, randomly selecting one vacant compilation machine to compile the task to be compiled; and
upon determining that there is only one vacant compilation machine, selecting the vacant compilation machine to compile the task to be compiled.

7. The method according to claim 1, further comprising: after having selected the corresponding compilation machine for the task to be compiled, obtaining the IP address of the selected compilation machine, and transmitting the task to be compiled to the selected compilation machine with the IP address.

8. The method according to claim 1, wherein marking the task in a waiting state includes setting the first attribute value to be 0 and the second attribute value to be 1, and the method further comprises: upon determining that the task to be compiled is to enter the compile stage and further transmitted to the compilation machine, setting the first attribute value to be 1 and the second attribute value to be 0 to indicate the proceeding to the compile stage.

9. A method for allocation of compilation machines, comprising:
initiating and storing a task to be compiled and marking the task in a waiting state to wait for compilation on a compilation machine;
wherein marking the task in a waiting state includes preconfiguring a first attribute value and a second attribute value of the task and setting the first attribute value and the second attribute value to be different values;
acquiring a first threshold number of tasks of a same type the compilation machine is able to compile simultaneously as well as a second threshold number of maximum tasks the compilation machine is able to compile simultaneously, the first threshold number being smaller than or equal to the second threshold number;
fetching a compile command, and determining whether a number of tasks the compilation machine is currently compiling is greater than or equal to the first threshold number, and upon determining that the number of tasks the compilation machine is currently compiling is less than the first threshold number, setting the task to be compiled to enter the compile stage and further transmitting the task to be compiled to the compilation machine; upon determining that the number of tasks the compilation machine is currently compiling is greater than or equal to the first threshold number, determining whether a number of tasks the compilation machine is currently compiling is greater than or equal to the second threshold number, and setting the task to be compiled to continue waiting for compilation upon determining that the number of tasks the compilation machine is currently compiling is greater than or equal to the second threshold number;
upon determining that the number of tasks the compilation machine is currently compiling is less than the second threshold number, determining whether there are any tasks the compilation machine is currently compiling that is of a same type as the task to be compiled, and upon determining that there is none, setting the task to be compiled to enter the compile stage and further transmitting the task to be compiled to the compilation machine;
upon determining that there are any tasks of the same type as the task to be compiled that is currently compiled on the compilation machine, determining whether a number of tasks of the same type as the task to be compiled is greater than or equal to the first threshold number, and setting the task to be compiled to enter the compile stage and further transmitting the task to be compiled to the compilation machine upon determining that the number of tasks of the same type as the task to be compiled is less than the first threshold number; otherwise, setting the task to be compiled to continue waiting for compilation;
wherein, prior to setting the task to be compiled to enter the compile stage or continue waiting for compilation, the method further comprises:
determining whether there is a vacant compilation machine;
upon determining that there is no vacant compilation machine, randomly selecting a compilation machine and sending the task to be compiled to the selected compilation machine;
upon determining that there is at least one vacant compilation machine, selecting one of the vacant compilation machine to compile the task to be compiled.

10. The method according to claim 9, further comprising establishing three data tables to record project information, compilation machines information, and compilation tasks information, respectively, when storing the task to be compiled.

11. The method according to claim 10, wherein the project information comprises a type of the task to be compiled; the compilation machine information comprises an IP address, name, types of tasks compiled, and current remaining compilation space, of each compilation machine; and the compilation tasks information comprises information of compilation machines that is currently working and information of tasks they are currently compiling.

12. The method according to claim 9, further comprising: upon determining that the number of tasks the compilation machine is currently compiling is greater than the second threshold number by an amount larger than or equal to two, further setting the task to be compiled from the current waiting state to a sleep stage; and until the number of tasks the compilation machine is currently compiling is greater than the second threshold number by one, returning the task to be compiled to the waiting state.

13. A system for allocation of compilation machines, comprising one or more processors and a non-transitory program storage medium containing a program product executable by the processors, the program product comprising:
a customized mechanism configured to initiate a task to be compiled and further initiate a compile command;
a database configured to store the task to be compiled; and
an allocation mechanism configured to mark the task to be compiled that is stored in the database in a waiting state to wait for compilation on a compilation machine, wherein the allocation mechanism marks the task to be compiled that is stored in the database in a waiting state by preconfiguring a first attribute value and a second attribute value of the task and setting the first attribute value and the second attribute value to be different values, and wherein the allocation mechanism further comprises:
an acquisition unit configured to acquire a first threshold number of tasks of a same type the compilation machine is able to compile simultaneously as well as a second threshold number of maximum tasks the compilation machine is able to compile simultaneously, the first threshold number being smaller than or equal to the second threshold number;
a first determination unit configured to determine whether a number of tasks the compilation machine is currently compiling is greater than or equal to the first threshold number;
an assignment unit configured to, upon determining that the determination result of the first determination unit is no, set the task to be compiled to enter the compile stage and further transmit the task to be compiled to the compilation machine; and
a second determination unit configured to, upon determining that the determination result of the first determination unit is yes, further determine whether a number of tasks the compilation machine is currently compiling is greater than or equal to the second threshold number; wherein
the assignment unit is configured to set the task to be compiled to continue waiting for compilation upon determining that the determination result of the second determination unit is yes;
wherein, the allocation mechanism further comprises: a third determination unit configured to, upon determining that the determination result of the second determination unit is no, further determine whether there are any tasks the compilation machine is currently compiling that is of a same type as the task to be compiled; wherein the assignment unit configured to, upon determining that the determination result of the third determination unit is no, set the task to be compiled to enter the compile stage and further transmit the task to be compiled to the compilation machine;
wherein, the allocation mechanism further comprises: a fourth determination unit configured to, upon determining that the determination result of the third determination unit is yes, further determine whether a number of tasks of the same type as the task to be compiled that the compilation machine is currently compiling is greater than or equal to the first threshold number; wherein the assignment unit is configured to, upon determining that the determination result of the fourth determination unit is no, set the task to be compiled to enter the compile stage and further transmit the task to be compiled to the compilation machine, and otherwise upon determining that the determination result of the fourth determination unit is yes, set the task to be compiled to continue waiting for compilation;
wherein, the system further comprises an auxiliary processing unit configured to: prior to setting the task to be compiled to enter the compile stage or continue waiting for compilation, determine whether there is a vacant compilation machine;
upon determining that there is no vacant compilation machine, randomly select a compilation machine and send the task to be compiled to the selected compilation machine;
upon determining that there is at least one vacant compilation machine, select one of the vacant compilation machine to compile the task to be compiled.

14. The system according to claim 13, wherein the assignment unit is further configured to: upon determining that the second determination unit determines the number of tasks the compilation machine is currently compiling is greater than the second threshold number by an amount larger than or equal to two, set the task to be compiled from the current waiting state to entering a sleep stage; and upon determining that the number of tasks the compilation machine is currently compiling is greater than the second threshold number by one, return the task to be compiled to the waiting state.

* * * * *